United States Patent
Misso et al.

(10) Patent No.: US 6,556,387 B1
(45) Date of Patent: Apr. 29, 2003

(54) CONTROLLING MECHANICAL RESPONSE CHARACTERISTICS OF A DISC DRIVE ACTUATOR BY ADJUSTING A FASTENER ENGAGING THE ACTUATOR SHAFT TO VARY AXIAL FORCE ON THE BEARING ASSEMBLY

(75) Inventors: Nigel F. Misso, Yukon, OK (US); Dana P. Eddings, Yukon, OK (US); Todd W. Kube, Boulder, CO (US); James H. Smith, Woodside, CA (US); Dave P. McReynolds, Loveland, CO (US); ChoonKiat Lim, Singapore (SG); Marc J. Lalouette, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 212 days.

(21) Appl. No.: 09/716,987

(22) Filed: Nov. 20, 2000

Related U.S. Application Data
(60) Provisional application No. 60/193,682, filed on Mar. 31, 2000.

(51) Int. Cl.[7] .................................................. G11B 5/55
(52) U.S. Cl. ..................................................... 360/265.6
(58) Field of Search ............................ 360/265.2–265.6

(56) References Cited

U.S. PATENT DOCUMENTS 4,391,035 A * 7/1983 Van Du Bult ............ 360/265.6

* cited by examiner

Primary Examiner—A. J. Heinz
(74) Attorney, Agent, or Firm—Fellers, Snider, et al.

(57) ABSTRACT

Apparatus and method for adjusting an actuator mechanical response characteristic in a data handling system, such as a disc drive. An actuator rotates about a pivot system to move a read/write head adjacent a recording surface, the pivot system comprising a stationary shaft and a bearing asesmbly comprising a stationary inner race coupled to the shaft and a rotatable outer race coupled to the actuator. A fastener is provided to engage the shaft and apply an initial amount of axially directed force on the inner race. A broad spectrum excitation is applied to the actuator and a mechanical response characteristic of the actuator is measured. The fastener is repetitively adjusted to increase the amount of axially directed force until the measured mechanical response characteristic of the actuator reaches a desired level.

15 Claims, 5 Drawing Sheets

CONTROLLING MECHANICAL RESPONSE CHARACTERISTICS OF A DISC DRIVE ACTUATOR BY ADJUSTING A FASTENER ENGAGING THE ACTUATOR SHAFT TO VARY AXIAL FORCE ON THE BEARING ASSEMBLY

RELATED APPLICATIONS

This application claims priority to United States Provisional Application No. 60/193,682 filed Mar. 31, 2000.

FIELD OF THE INVENTION

This invention relates generally to the field of data handling systems, and more particularly, but not by way of limitation, to an apparatus and method for adjusting bearing preload in an actuator pivot system to produce a population of nominally identical data handling systems, such as disc drives, having actuators with substantially uniform mechanical frequency response characteristics.

BACKGROUND

Disc drives are data handling systems used to perform primary data storage operations in modem computer systems and networks. A typical disc drive comprises a head-disc assembly (HDA) which houses mechanical portions of the drive, and a printed circuit board assembly (PCBA) mounted to an outer surface of the HDA which supports electronic circuitry used to control the HDA.

Typically, an HDA comprises a number of magnetic discs affixed to, and rotated by, a spindle motor at a constant high speed. An actuator supports an array of read/write heads adjacent the disc surfaces. The surface of each disc is a data recording surface divided into a series of generally concentric recording tracks radially spaced across a band having an inner diameter and an outer diameter. The data tracks extend around the surfaces of the discs and data are stored to the tracks by the heads in the form of magnetic flux transitions. Typically, each data track is divided into a number of data sectors that store fixed sized data blocks.

An actuator motor, such as a voice coil motor (VCM), rotates the actuator, and hence the heads, across the disc surfaces. The control circuitry on the PCBA includes a read/write channel which interfaces with the heads to transfer data between the tracks and a host computer, and a servo control system which drives the VCM to provide head positional control, based on servo data stored in servo fields interspersed among the data sectors and written during disc drive manufacturing.

Continued demand for disc drives with ever increasing levels of data storage capacity and data throughput have led disc drive manufacturers to seek ways to increase the storage capacity of each disc surface and improve drive operating efficiencies. At the same time, disc drive manufacturers are under continual pressure to reduce the cost per megabyte associated with the manufacture and marketing of their product offerings.

One area for opportunity is the actuator used within the disc drive. The industry has substantially settled on a design featuring a flat coil rotary actuator with a body portion rotatable about a bearing assembly and actuator arms which project from the body portion toward the discs. This portion of the actuator is sometimes referred to as an "E-block" or "actuator core." The E-block rotates using a pivot system typically comprising a cartridge bearing assembly having an inner shaft, an outer cylindrical sleeve and a pair of axially displaced bearing assemblies fixed therebetween. Generally, the outer surface of the outer sleeve is attached in the central bore in the E-block. Tolerance rings are also sometimes used to aid the assembly of these components.

While operable, there are nevertheless limitations associated with this approach. The bore wall of the E-block, which necessarily requires a uniform diameter to accommodate the cartridge bearing assembly, can be subject to elastic deformation (buckling) under high force access operations such as during seeks when the E-block is rapidly accelerated and decelerated to move a head from one track to another. Such buckling is most pronounced along a plane that intersects the actuator coil and operates to move the coil sway mode to a lower frequency, negatively affecting servo performance.

Another limitation is that, for a given bore size, the cartridge bearing assembly artificially limits the maximum bearing size by the wall thicknesses of the inner and outer sleeves. With decreasing size, these wall thicknesses have become a significant portion of the overal size of the pivot system. Moreover, the use of the bearing cartridge assembly increases material costs of the drives and introduces part tolerance variations that can affect the frequency response of the system.

It is desirable when producing a large population of disc drives to provide the drives with substantially identical mechanical characteristics. Unfortunately, these and other factors have been found to contribute to large variations in the locations of the natural frequencies of the actuators. Hence, different drives can have substantially different mechanical response characteristics which can adversely affect servo performance during operation.

Accordingly, there is a need for an improved, cost-effective approach to assembling and configuring actuator pivot systems to provide a population of data handling systems with substantially identical mechanical response characteristics, and it is to such improvements that the present invention is directed.

SUMMARY OF THE INVENTION

The present invention is directed to an apparatus and method for providing an actuator of a data handling system, such as a disc drive, with desired mechanical response characteristics.

In accordance with preferred embodiments, a disc drive is provided with a rotary actuator which supports a read/write head adjacent a recording surface of a rotatable disc. The actuator rotates about a pivot system comprising a stationary shaft and a bearing assembly comprising a stationary inner race coupled to the shaft and a rotatable outer race coupled to the actuator.

A fastener, such as a threaded screw, is provided to engage the shaft and apply a selected amount of axially directed force on the inner race to provide the actuator with the desired mechanical response characteristics. The fastener preferably extends through a top cover of the disc drive and presses a contact area of the top cover onto the inner race.

In a related aspect, the pivot system further comprises a second bearing assembly axially displaced from the first bearing assembly, the second bearing assembly comprising a stationary inner race coupled to the shaft and a rotatable outer race coupled to the actuator. The actuator includes a central bore through which the shaft extends, and a circumferentially extending step radially extends within the bore in a direction toward the shaft and abuttingly engages the respective outer races of the first and second bearing assemblies. The step reduces buckling of the actuator during high energy access operations.

In another related aspect, a compressive member circumferentially extends about the shaft and applies an axially directed force against the respective inner races of the first and second bearing assemblies to counteract the force applied by the fastener and increase the resolution of the fastener.

The desired mechanical resonance characteristics are preferably selected by steps of applying a broad spectrum excitation to the actuator, such as by the application of swept sine currents to an actuator motor; measuring mechanical response characteristics of the actuator in response to the broad spectrum excitation; and repetitively adjusting the fastener to increase the amount of axially directed force until the measured mechanical response characteristics of the actuator reach a desired level. Preferably, these steps are carried out during the writing of servo position data during disc drive manufacturing using a servo track writer (STW) station, and serve to produce a population of nominally identical disc drives with closely controlled and matched response characteristics.

These and various other features and advantages which characterize the present invention will be apparent from a reading of the following detailed description and a review of the associated drawings.

DETAILED DESCRIPTION

Figure 1:
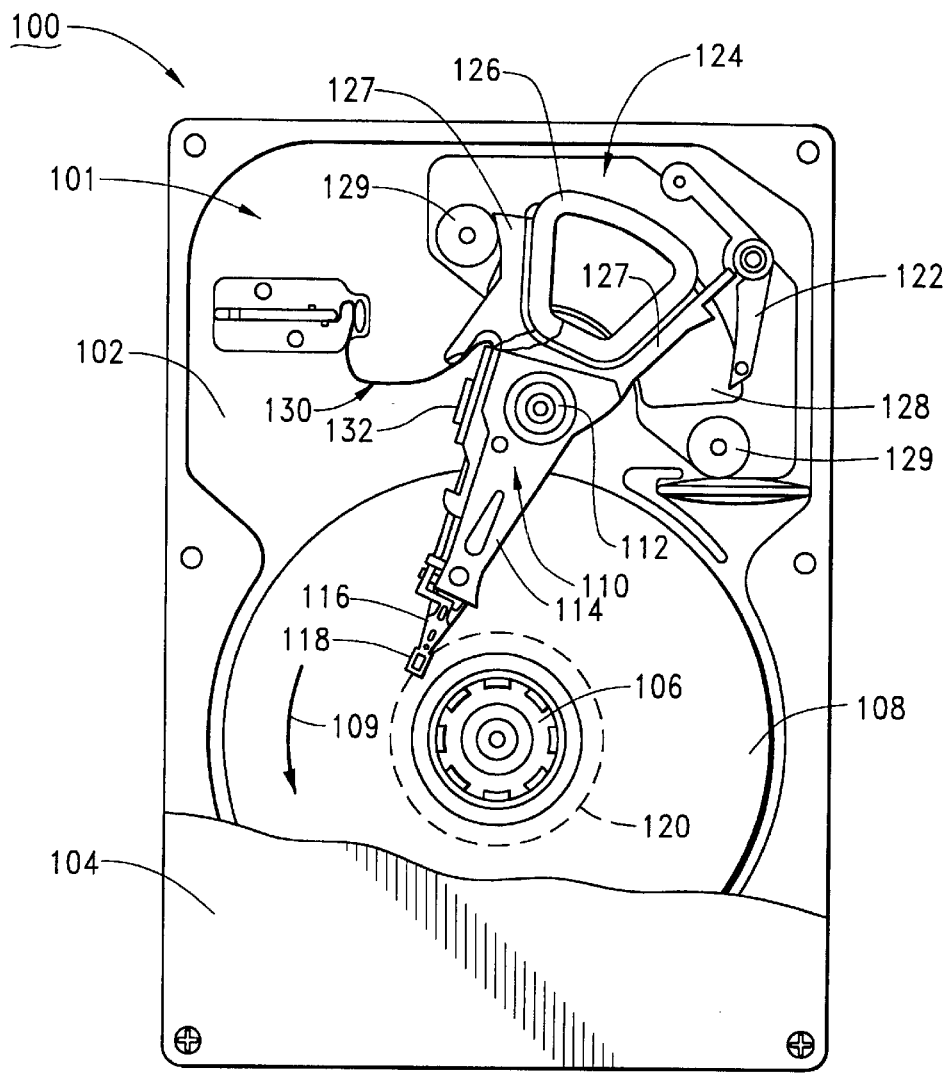
FIG. 1 is a top plan view of a disc drive data handling system constructed in accordance with preferred embodiments of the present invention.

Referring to the drawings in general, and more particularly to FIG. 1, shown therein is a top view of a disc drive data handling system 100 (hereinafter "disc drive") constructed in accordance with preferred embodiments of the present invention. It will be noted that numerous details of and variations for the construction of the disc drive 100 are not included in the following description as such are well known to those skilled in the art and are believed to be unnecessary for the purpose of presenting the various embodiments of the invention.

The disc drive 100 is composed of two main assemblies: a head/disc assembly (HDA) 101 which houses various mechanical components of the disc drive 100, and a disc drive printed circuit board assembly (PCBA) which supports various electronic communication and control circuits. The PCBA is affixed to the underside of the HDA 101 and is therefore not visible in FIG. 1.

The HDA 101 includes a base deck 102 that supports various mechanical components of the disc drive 100. A top cover 104 (shown in partial cut-away fashion) cooperates with the base deck 102 to form an internal housing for the disc drive 100. A spindle motor 106 rotates a number of recording discs 108 in an angular direction indicated at 109.

An actuator 110 rotates adjacent the discs 108 by way of an actuator pivot system 112, various embodiments of which will be presented shortly. At this point, however, it will be noted that the actuator 110 includes a number of rigid actuator arms 114 which support flexible suspension assemblies (flexures) 116. The flexures, in turn, support a corresponding number of read/write heads 118 adjacent the respective disc recording surfaces.

When the disc drive is deactivated, the heads 118 are brought to rest upon texturized landing zones 120 and the actuator 110 is secured using a latch 122. During operation, the actuator 110 is rotated by a voice coil motor (VCM) 124 comprising an actuator coil 126 supported by coil support arms 127 adjacent a permanent magnet 128. It will be noted that a second permanent magnet is supported above the coil 126 to complete the VCM 124, but such has been omitted from the view of FIG. 1. Compliant limit stops 129 limit the angular extent of actuator travel and serve to protect the actuator from damage. Finally, a flex circuit assembly 130 provides communication paths between the actuator 110 and the aforementioned PCBA and includes a preamplifier/driver circuit (preamp) 132 which applies write and read bias currents to the heads 120 during writing and reading operations.

Figure 2:
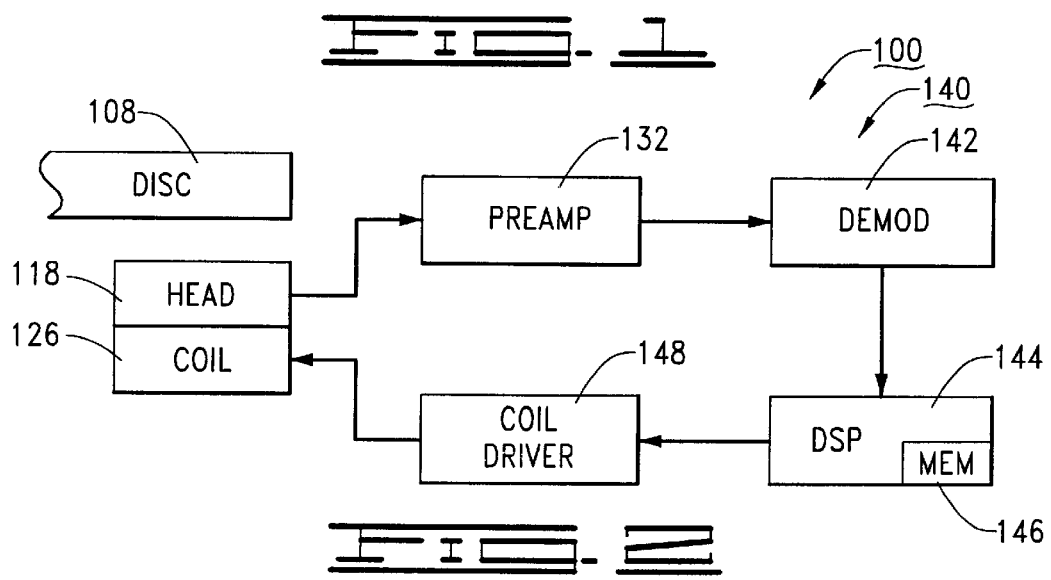
FIG. 2 is a functional block diagram of a servo control system of the disc drive of FIG. 1.

FIG. 2 provides a functional block diagram of a servo control circuit 140 used to provide closed loop positional control of the actuator 110. Servo position data in the form of radially displaced servo fields written during disc drive manufacturing are transduced by a selected head 118, preamplified by the preamp 132 and provided to a demodulation circuit (demod) 142 which conditions the data for use by a digital signal processor (DSP) 144. The DSP 144, in accordance with commands from a top level disc drive processor (not shown) and programming steps provided in DSP memory (MEM) 146, outputs a current correction signal to a coil driver circuit 148 to adjust the current applied to the coil 126, and hence, the position of the selected head 118.

The servo control circuit 140 is designed to provide optimal actuator control based on an expected range of mechanical response characteristics of the actuator 110. While various parameters of the servo control circuit 140 (gains, adaptive filter settings, etc.) can be adjusted somewhat to compensate for variations in these mechanical response characteristics, overall servo performance suffers when the extent of such variations varies substantially from the expected range.

One of the primary factors that affects the mechanical response of the actuator 110 is the stiffness of the actuator, which in turn is affected by the amount of bearing preload in the actuator pivot system 112. Accordingly, the present invention (as embodied herein and as claimed below) provides an improved actuator pivot system configuration and adjustment methodology that enables a disc drive manufacturer to measure and tune a mechanical response characteristic of each disc drive during manufacturing to obtain consistency across a population of drives.

Various preferred embodiments for the actuator pivot system 112 are shown in FIGS. 3–6. For simplicity of discussion, the same reference numerals will be used to identify similar components in each of these figures.

Figure 3:
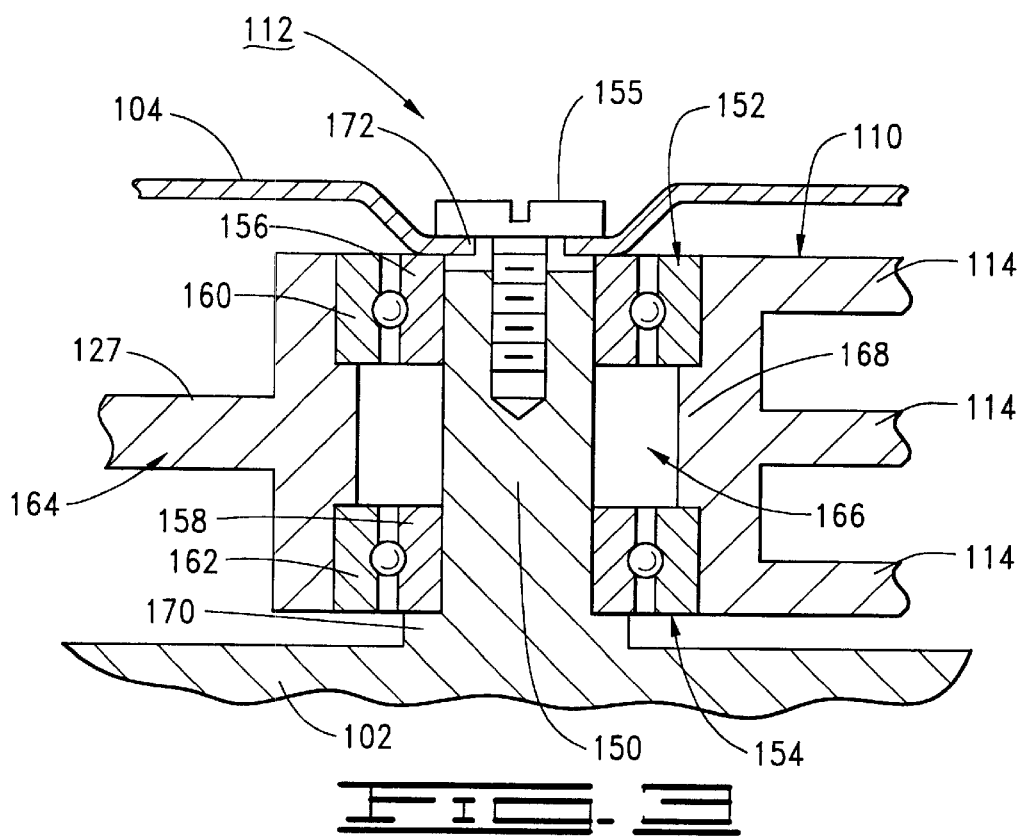
FIG. 3 is an elevational cross-sectional view of an actuator pivot system for the disc drive of FIG. 1 in accordance with a preferred embodiment of the present invention.

The actuator pivot system 112 of FIG. 3 comprises a stationary post 150 which projects from the base deck 102, a pair of upper and lower ball bearing assemblies 152, 154 which are affixed onto the post 150, and a top cover fastener 155 which engages a threaded aperture (not numerically designated) in the post 150. The ball bearing assemblies 152, 154 are provisioned with respective inner races 156, 158 and outer races 160, 162 (also referred to as first and second races, respectively). The actuator 110 includes an E-block 164 having a central bore 166 with an inwardly directed, circumferentially extending flange, or step 168.

During assembly, the inner race 158 of the lower ball bearing assembly 154 is pressed onto the post 150 to abuttingly engage a circumferentially extending step 170 at the base of the post 150. The E-block 164 is affixed onto the outer race 162 of the lower ball bearing assembly 154 to bring the inner wall of the central bore 166 and the step 168 into abutting engagement with the outer race 162.

The upper ball bearing assembly 152 is next pressed into the central bore 166 of the E-block 164 so that the inner race 156 engages the post 150 and the outer race 160 engages the inner wall of the central bore 166 and the step 168. While optional, the step 168 advantageously serves to establish the axial placement of the ball bearing assemblies 152, 154 as well as to increase the ability of the E-block 164 to resist buckling during high energy access operations.

The top cover 104 is provided with a contact area 172 which, when the top cover 104 is mated with the base deck 102, contacts the inner race 156 of the upper ball bearing assembly 152. The contact area 172 includes a central aperture (not numerically designated) though which the fastener 155 extends. By tightening the fastener 155, an axially directed compressive force is transmitted through the contact area 172 of the top cover onto the inner race 156 (and, by way of outer race 160, E-block 164 and outer race 162) onto the inner race 158. The fastener 155 can thus be used to adjust the amount of bearing preload, and hence, the mechanical response characteristics, of the actuator 110. The fastener 155 is preferably provided with a relatively fine thread pitch (for example, #4–100) and a locking feature, such as tri-lobe threads to maintain the fastener 155 in the desired position after adjustment. A preferred manner to adjust the depth of the fastener 155 will be discussed below.

Figure 4:
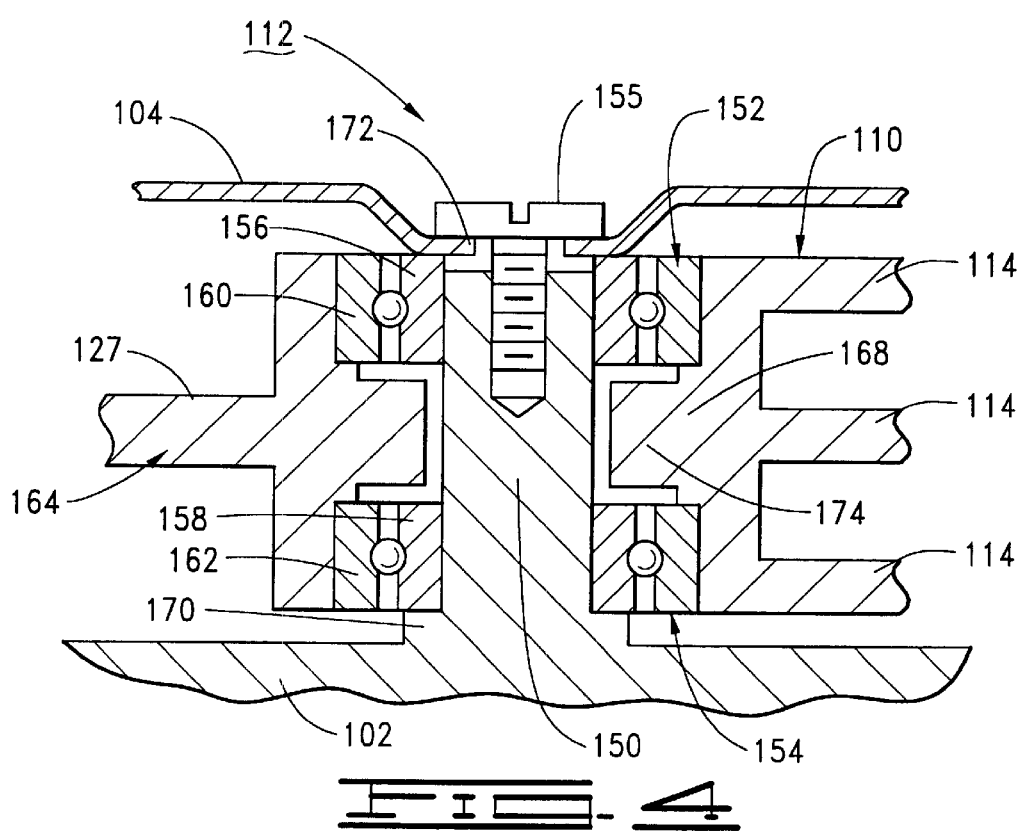
FIG. 4 is an elevational cross-sectional view of an actuator pivot system for the disc drive of FIG. 1 in accordance with another preferred embodiment of the present invention.

FIG. 4 provides an alternative preferred embodiment for the actuator pivot system 112, which is similar to the configuration of FIG. 3 except that the E-block 164 further includes a second inwardly directed, circumferentially extending flange, or step 174 which projects from the step 168 (also referred to in this embodiment as "first step" 168). It will be noted that the second step 174 projects to a distal position closely adjacent the post 150 and the inner races 156, 158, and serves to provide the E-block 164 with additional strength to resist buckling during high energy access operations.

Figure 5:
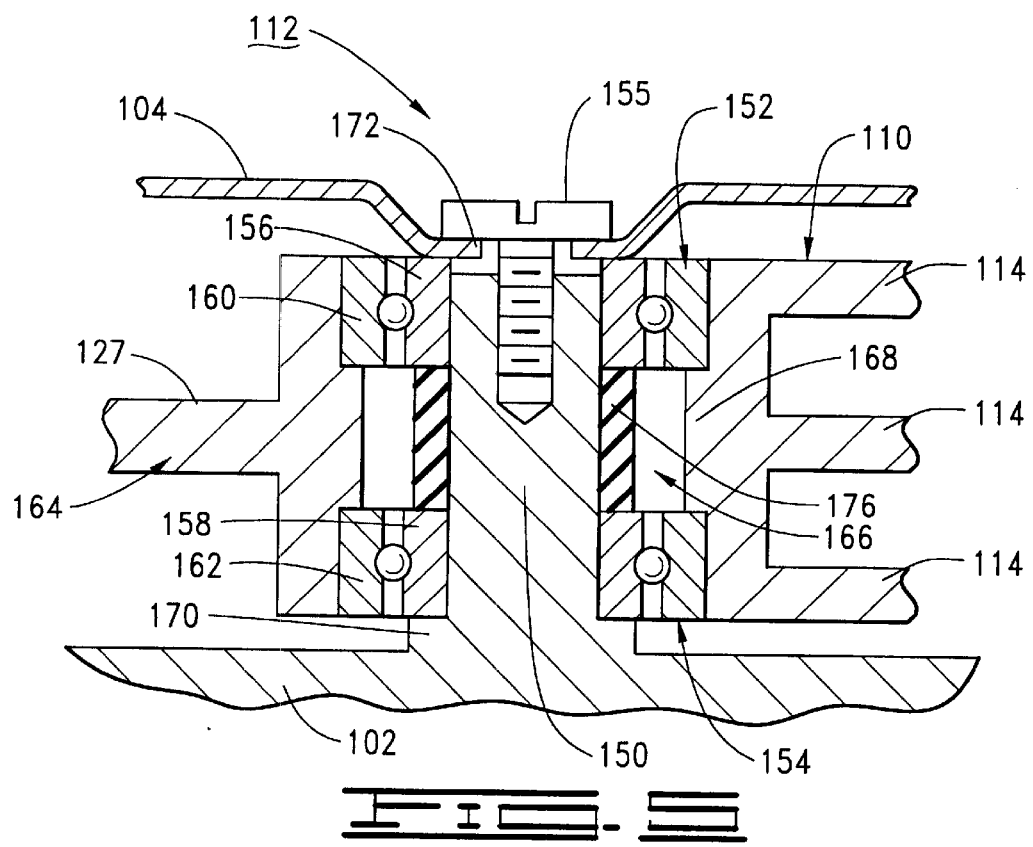
FIG. 5 is an elevational cross-sectional view of an actuator pivot system for the disc drive of FIG. 1 in accordance with yet another preferred embodiment of the present invention.

FIG. 5 provides another alternative preferred embodiment for the actuator pivot system 112, which is similar to the configuration of FIG. 3 except for the addition of a compressible spacer 176 disposed about the post 150. The spacer 176 is provided with a nominally longer axial length than the step 168 so that, upon installation, the inner races 156, 158 compress opposing ends of the spacer 176. This compression of the spacer 176 counteracts the compressive force induced by the fastener 155, thereby allowing the fastener 155 to operate at a higher force level and increased adjustment resolution.

Figure 6:
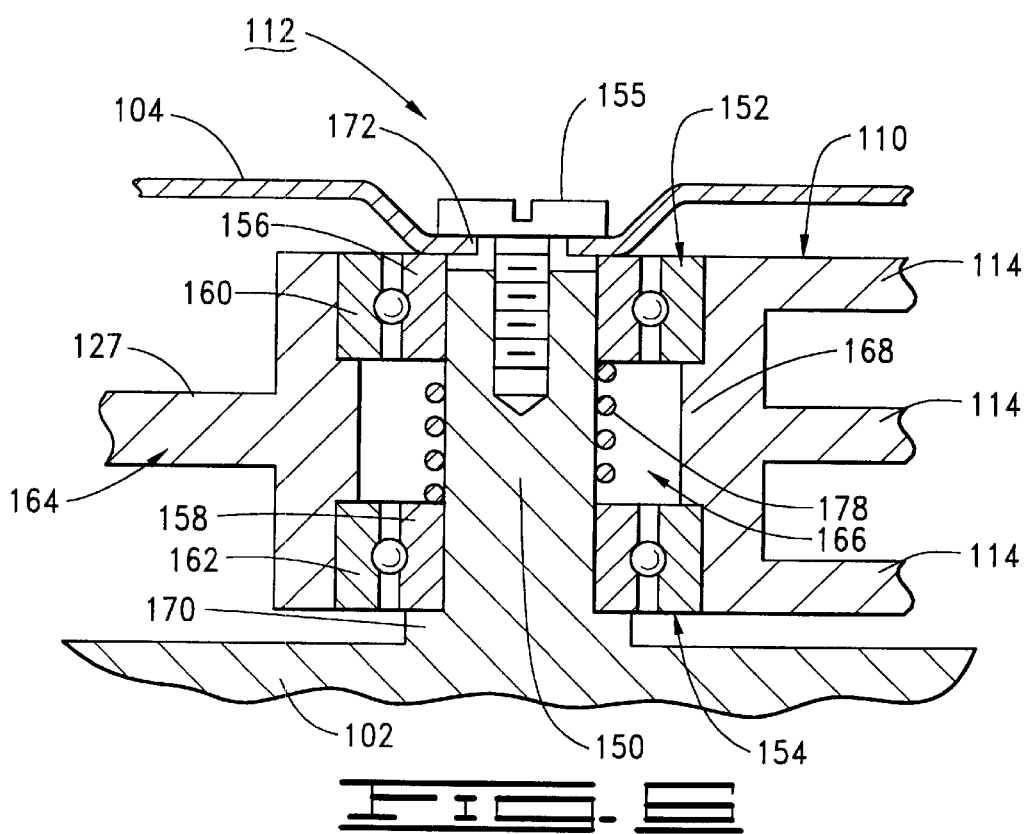
FIG. 6 is an elevational cross-sectional view of an actuator pivot system for the disc drive of FIG. 1 in accordance with yet another preferred embodiment of the present invention.

FIG. 6 provides yet another alternative preferred embodiment for the actuator pivot system 112. The embodiment of FIG. 6 is similar to the embodiment of FIG. 5, except that the embodiment of FIG. 6 utilizes a coiled spring about the post 150 between the inner races 156, 158. As with the spacer 176 of FIG. 5, the spring 178 also bears against the inner races 156, 158, increasing the adjustment resolution of the fastener 155.

Figure 7:
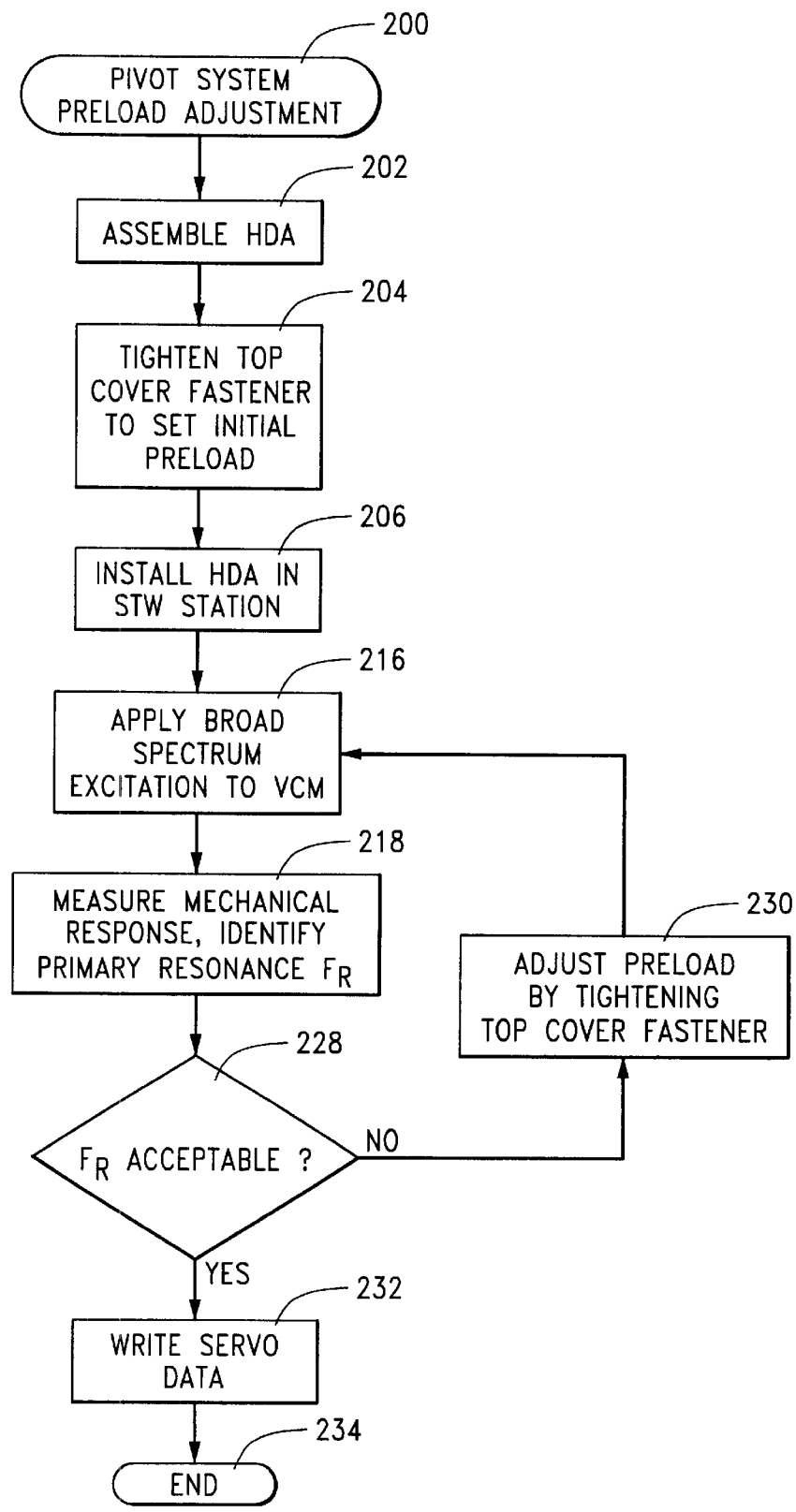
FIG. 7 is a flow chart for a PIVOT SYSTEM PRELOAD ADJUSTMENT routine, illustrative of steps carried out in accordance with preferred embodiments of the present invention to adjust the mechanical response characteristics of an actuator to a desired range.

Referring now to FIG. 7, shown therein is a PIVOT SYSTEM PRELOAD ADJUSTMENT routine 200, illustrative of steps carried out in accordance with preferred embodiments to adjust the response characteristics of the actuator 110 to a desired range. It will be noted that the routine of FIG. 7 is contemplated as being carried out during disc drive manufacturing in a high volume production environment.

At step 202, the HDA 101 is first assembled to have a desired configuration such as the various configurations discussed above with reference to FIGS. 3–6. Once assembled, as shown at step 204, the top cover fastener 155 is tightened to a first level to set an initial preload on the actuator 110. Since it is contemplated that during the operation of the routine of FIG. 7 the fastener will be successively tightened in a controlled manner to bring increased amounts of compressive force upon the actuator 110, preferably a relatively low amount of torque is initially applied to the fastener 155 so that a minimal amount of preload is provided by the fastener 155. For example, the fastener 155 may only be "hand-tight" initially (i.e., loose enough so that a user may be able to subsequently loosen the fastener using only the user's fingers).

Figure 8:
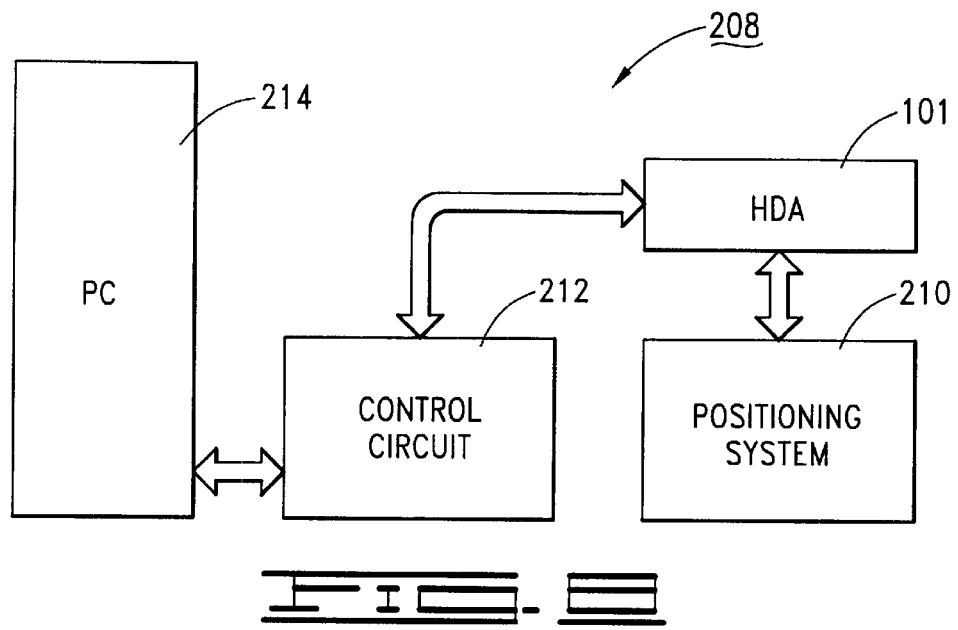
FIG. 8 is a simplified functional block diagram of a servo track writer (STW) station used to write servo data to the discs of the disc drive of FIG. 1, the STW station configured to carry out steps set forth by the routine of FIG. 7.

As shown by step 206, the HDA 101 is next installed into a servo track writer (STW) station, such as shown in FIG. 8. More particularly, FIG. 8 provides a simplified functional diagram of an STW station 208 configured to write servo data to the discs 108. As will be recognized by those having skill in the art, STW stations are complex electo-mechanical equipment stations which control the writing and read verification of the servo data to the discs of an HDA in a highly precise manner.

For purposes of the present discussion however, it will be sufficient to note that the STW station 208 includes a positioning system 210 which detects and controllably advances the position of the actuator 110; a control circuit 212 which emulates the disc drive PCBA electronics to write and read verify the servo data as well as to provide interface control to the positioning system; and a personal computer (PC) 214 which provides overall user control of the STW process.

In a preferred embodiment, the positioning system 210 employs a push-pin or similar feature to physically hold and advance the actuator 110 (through an aperture in the base deck 102), the control circuit 212 is configured to apply currents to the actuator coil 126, and the PC 214 is provided with a data acquisition card to record and graphically display actuator position data from the positioning system 210.

Returning to the routine of FIG. 7, once the HDA 101 is installed in the STW station 208, as shown by step 216 the positioning system 210 holds the actuator 110 in a desired position (such as in abutting engagement with a selected one of the limit stops 129 of FIG. 1) while the control circuit 212 applies a broad spectrum excitation to the VCM 124. More particularly, the control circuit 212 applies a series of alternating current profiles over a selected frequency range (such as a "swept sine" input) to the actuator coil 126. This subjects the actuator 110 to a broad spectrum of excitation frequencies and will cause the actuator 110 to vibrate at the natural frequencies of the actuator 110.

Figure 9:
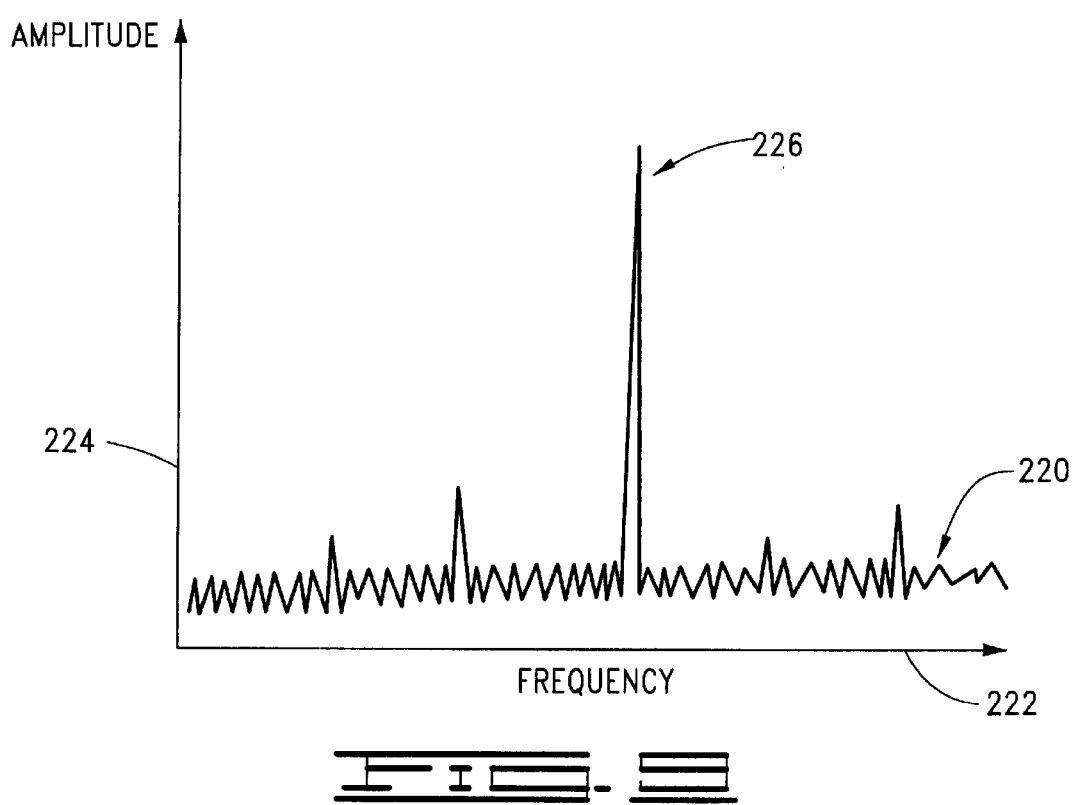
FIG. 9 is a graphical representation of a frequency response measurement obtained during the routine of FIG. 7.

The mechanical response characteristics of the actuator 110 are measured by the PC 214 during step 218, and preferably displayed to a monitor of the PC in a format such as shown by FIG. 9. More particularly, FIG. 9 provides a graphical representation of a mechanical response spectrum of the actuator 110 as a result of the excitation of step 216. A response curve 220 is plotted against an x-axis 222 indicative of frequency and a y-axis 224 indicative of resonance amplitude. It will be noted, however, that other types of plot formats can readily be used.

The response curve 220 is typical of the type of excitation data made available from the operation of steps 216 and 218. Such excitation data will typically identify a primary response spike 226 indicative of the primary resonance frequency of the system. That is, the particular frequency corresponding to the spike 226 is a natural frequency of the actuator structure and excitation of the actuator structure at this frequency produces the largest amount of resonance (at least over the evaluated range). For reference, in some disc drive designs the primary resonance frequency has been found to vary from a value of about 5200 Hertz (Hz) to a value of 6000 Hz. It can be readily seen that a servo control circuit design can have difficulty accommodating resonance characteristics over such a large range.

Accordingly, it is contemplated that the excitation data obtained during step 218 will be displayed in real time to the PC monitor and a STW user will evaluate the data to identify the primary resonance frequency (denoted as $F_R$). As shown by decision step 228, the user determines whether the primary resonance frequency is within an acceptable range at a sufficiently high level so as to not adversely affect on the operation of the servo control circuit 140. An example range might be, for example, 6500 Hz±50 Hz. If the primary resonance frequency is not acceptable (which will typically be the case the first pass through the routine), the flow passes to step 230 wherein the user applies torque to the top cover fastener 155 (using a suitable driver tool) to tighten the fastener 155 a preselected number of turns.

The routine then returns to step 216 where once again broad spectrum excitation is applied to the actuator 110 and the frequency response is measured. Steps 216, 218, 228 and 230 are thus repetitively performed until the desired mechanical frequency response characteristics are achieved. At this point, the routine passes to step 232 wherein the STW station 208 proceeds to write the servo data in a conventional manner. The routine then ends at step 234.

It will be noted that the present invention, as embodied herein and as claimed below, presents several advantages over the prior art. First, while it is contemplated that the flow of FIG. 7 could be performed on an actuator 110 incorporating a cartridge bearing assembly, such is unnecessary and preferably eliminated. The use of additional material (steps 168, 174) within the central bore of the E-block 164 advantageously reduces buckling during high energy access opera-tions. Moreover, the routine of FIG. 7 produces a population of nominally identical disc drives with closely controlled and matched mechanical resonance characteristics which improves operational repeatability and reliability of the population.

It will now be understood that one aspect of the present invention is directed to a data handling system, such as a disc drive 100, comprising a a rotary actuator 110 which supports a read/write head 118 adjacent a recording surface of a disc 108. The actuator rotates about a pivot system 112 comprising a stationary shaft 150 and a bearing assembly 152 comprising a stationary first race 156 coupled to the shaft and a rotatable second race 160 coupled to the actuator. A fastener 155 is provided to engage the shaft and apply a selected amount of axially directed force on the first race to provide the actuator with a desired mechanical response characteristic.

In a related aspect, the data handling system further comprises a housing 104 which forms an internal enclosure for the actuator and the pivot system, the housing comprising a contact area 172 with a central aperture through which the fastener extends so that the fastener presses the contact area onto the first race to apply the selected amount of axially directed force to the first race.

In another related aspect, the bearing assembly is characterized as a first bearing assembly, and wherein the pivot system further comprises a second bearing assembly 154 axially displaced from the first bearing assembly and comprising a stationary first race 158 coupled to the shaft and a rotatable second race 162 coupled to the actuator, wherein the selected amount of axially directed force is further applied to the first race of the second bearing assembly. In a related aspect, the actuator is further provided with a central bore 166 through which the shaft extends, and wherein a circumferentially extending step 168 radially extends within the bore in a direction toward the shaft and abuttingly engages the respective second races of the first and second bearing assemblies.

In another related aspect, the pivot system further comprises a compressive member 176, 178 circumferentially extending about the shaft which applies an axially directed force against the respective first races of the first and second bearing assemblies.

The present invention is also directed to a method for providing an actuator 110 of a data handling system, such as a disc drive 100, with desired a mechanical resonance characteristic. The actuator pivots about a pivot system 112 having a stationary shaft 150 and a bearing assembly 152 comprising a stationary first race 156 coupled to the shaft and a rotatable second race 160 coupled to the actuator.

The method includes steps of providing a fastener 155 which engages the shaft and applies an initial amount of axially directed force on the first race; applying a broad spectrum excitation to the actuator (step 216); measuring a mechanical response characteristic of the actuator in response to the broad spectrum excitation (step 218); and repetitively adjusting the fastener (step 230) to increase the amount of axially directed force until the measured mechanical response characteristics of the actuator reach a desired level.

In a related aspect, the applying step comprises steps of holding the actuator in a nonrotating position and applying sinusoidal currents to an actuator motor coupled to the actuator over a range of frequencies.

For purposes of the appended claims, the phrase "a desired mechanical response characteristic" will be understood consistent with the foregoing discussion to describe a frequency response of the structure, such as graphically illustrated by FIG. 9.

While method claims are provided below with alphameric step designations, such are merely for purposes of convenience so that the claims are not necessarily limited to the order shown. While presently preferred embodiments have been presented in the environment of a disc drive, it will be readily understood that the present invention can be advantageously used in other types of data handling systems, such as optical and magneto/optical data storage systems.

It is clear that the present invention is well adapted to attain the ends and advantages mentioned as well as those inherent therein. While presently preferred embodiments of the invention have been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. A data handling system, comprising:
    a rotary actuator which supports a read/write head adjacent a recording surface; and
    a pivot system about which the actuator rotates, comprising:
        a stationary shaft;
        a bearing assembly comprising a stationary first race coupled to the shaft and a rotatable second race coupled to the actuator; and
        a fastener which engages the shaft and applies a selected amount of axially directed force on the first race to provide the actuator with a desired mechanical response characteristic.

2. The data handling system of claim 1, further comprising a housing which forms an internal enclosure for the actuator and the pivot system, the housing comprising a contact area with a central aperture through which the fastener extends so that the fastener presses the contact area onto the first race to apply the selected amount of axially directed force to the first race.

3. The data handling system of claim 1, wherein the bearing assembly is characterized as a first bearing assembly, and wherein the pivot system further comprises a second bearing assembly axially displaced from the first bearing assembly and comprising a stationary first race coupled to the shaft and a rotatable second race coupled to the actuator, wherein the selected amount of axially directed force is further applied to the first race of the second bearing assembly.

4. The data handling system of claim 3, wherein the actuator has a central bore through which the shaft extends, and wherein a circumferentially extending step radially extends within the bore in a direction toward the shaft and abuttingly engages the respective second races of the first and second bearing assemblies.

5. The data handling system of claim 4, wherein the step is characterized as a first step, and wherein the actuator further comprises a second circumferentially extending step which radially extends from the first step in a direction toward the shaft to a distal position adjacent the respective first races of the first and second bearing assemblies.

6. The data handling system of claim 3, wherein the pivot system further comprises a compressive member circumferentially extending about the shaft which applies an axially directed force against the respective first races of the first and second bearing assemblies.

7. The data handling system of claim 6, wherein the compressive member comprises a coiled spring formed from a continuous length of wire.

8. The data handling system of claim 1, wherein the selected amount of axially directed force is selected in accordance with a method comprising steps of:
    (a) applying a broad spectrum excitation to the actuator;
    (b) measuring a mechanical response characteristic of the actuator in response to the broad spectrum excitation; and
    (c) repetitively adjusting the fastener to increase the amount of axially directed force until the measured mechanical response characteristic from the measuring step (b) reaches a desired level.

9. The data handling system of claim 8, wherein the applying step (a) comprises steps of holding the actuator in a nonrotating position and applying sinusoidal currents to an actuator motor coupled to the actuator over a range of frequencies.

10. In a data handling system having a rotary actuator which supports a read/write head adjacent a recording surface and a pivot system about which the actuator rotates, the pivot system comprising a stationary shaft and a bearing asesmbly comprising a stationary first race coupled to the shaft and a rotatable second race coupled to the actuator, a method for providing the actuator with a desired mechanical resonance characteristic, comprising steps of:
    (a) providing a fastener which engages the shaft and applies an initial amount of axially directed force on the first race;
    (b) applying a broad spectrum excitation to the actuator;
    (c) measuring a mechanical response characteristic of the actuator in response to the broad spectrum excitation; and
    (d) repetitively adjusting the fastener to increase the amount of axially directed force until the measured mechanical response characteristic of the actuator reaches a desired level.

11. The method of claim 10, wherein the applying step (b) comprises steps of holding the actuator in a nonrotating position and applying sinusoidal currents to an actuator motor coupled to the actuator over a range of frequencies.

12. The method of claim 10, wherein the data handling system further comprises a housing which forms an internal enclosure for the actuator and the pivot system, and wherein the method further comprises steps of:
    (e) provisioning the housing with a contact area and a central aperture; and
    (f) inserting the fastener through the central aperture so that the fastener presses the contact area onto the first race.

13. The method of claim 10, wherein the bearing assembly is characterized as a first bearing assembly, wherein the pivot system further comprises a second bearing assembly axially displaced from the first bearing assembly and comprising a stationary first race coupled to the shaft and a rotatable second race coupled to the actuator, wherein the actuator has a central bore through which the shaft extends, and wherein the method further comprises a step of:
    (e) provisioning the actuator with a circumferentially extending step within the bore which extends in a direction toward the shaft and abuttingly engages the respective second races of the first and second bearing assemblies to reduce buckling of the central bore in response to a high energy access operation.

14. The method of claim 13, further comprising a step of:

(f) providing a compressive member circumferentially extending about the shaft which applies an axially directed force against the respective first races of the first and second bearing assemblies counter to the axially directed force applied by the fastener.

15. A data handling system, comprising:

a rotary actuator which rotates about a pivot system to move a read/write head adjacent a recording surface; and means for adjusting a mechanical response characteristic of the actuator by directing a selectable amount of axially directed force onto the pivot system.

\* \* \* \* \*